United States Patent
Yagi et al.

(10) Patent No.: US 9,091,797 B2
(45) Date of Patent: Jul. 28, 2015

(54) LIGHT GUIDE PANEL, SURFACE LIGHT SOURCE APPARATUS INCLUDING LIGHT GUIDE PANEL, AND FLAT PANEL DISPLAY INCLUDING SURFACE LIGHT SOURCE APPARATUS

(75) Inventors: Tadao Yagi, Yokohama (JP); Atsushi Sato, Yokohama (JP); Nobuji Sakai, Yokohama (JP); Yoshihiro Yokote, Yokohama (JP); Shigeto Kobori, Yokohama (JP); Hideki Imamura, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 265 days.

(21) Appl. No.: 13/530,739

(22) Filed: Jun. 22, 2012

(65) Prior Publication Data

US 2012/0327332 A1 Dec. 27, 2012

(30) Foreign Application Priority Data

Jun. 24, 2011 (JP) .................................. 2011-140649
Jan. 17, 2012 (KR) ........................ 10-2012-0005277

(51) Int. Cl.
*G02F 1/13357* (2006.01)
*F21V 8/00* (2006.01)

(52) U.S. Cl.
CPC ............ *G02B 6/0056* (2013.01); *G02B 6/0051* (2013.01); *G02B 6/0068* (2013.01)

(58) Field of Classification Search
CPC ....................... G02F 1/133615; G02B 6/0038
USPC ........................................... 349/65; 362/615
See application file for complete search history.

(56) References Cited

U.S. PATENT DOCUMENTS 7,147,903 B2    12/2006  Ouderkirk et al.
7,784,954 B1     8/2010  Coleman
(Continued)

FOREIGN PATENT DOCUMENTS

JP      1993-045519 A    2/1993
JP      11-502036 A      2/1999
(Continued)

OTHER PUBLICATIONS

Japanese Office Action mailed Feb. 24, 2015 for corresponding JP Application No. 2011-140649.

*Primary Examiner* — Thanh-Nhan P Nguyen
(74) *Attorney, Agent, or Firm* — Harness, Dickey & Pierce, P.L.C.

(57) ABSTRACT

A light guide panel includes: a light guide layer having a light incident surface; a polarization separation layer configured to select a desired polarization among light emitted from the light guide layer and to emit light having the polarization; and a light homogenization layer including a plurality of fibers and a supporting medium of the fibers, the light homogenization layer configured to diffuse and scatter light incident on the light guide layer into the light guide layer. The polarization separation layer includes: a plurality of first fibers having birefringence; and a first supporting medium that is isotropic and configured to support the first fibers. The refractive index of the first supporting medium corresponds to at least one of two different refractive indices of the first fibers. The light homogenization layer includes: a plurality of second fibers having birefringence; and a second supporting medium that is isotropic and configured to support the second fibers.

38 Claims, 9 Drawing Sheets

(56) References Cited

U.S. PATENT DOCUMENTS

2004/0042233 A1* 3/2004 Suzuki et al. ............... 362/561
2006/0056166 A1   3/2006 Yeo et al.
2007/0237938 A1* 10/2007 Ouderkirk et al. ......... 428/292.1
2008/0304282 A1* 12/2008 Mi et al. ..................... 362/607
2009/0079909 A1   3/2009 Ouderkirk et al.
2009/0251776 A1  10/2009 Ouderkirk et al.

FOREIGN PATENT DOCUMENTS

| JP | 2003-534566 A | 11/2003 |
| JP | 2004-151550 A | 5/2004 |
| JP | 2006-517720 A | 7/2006 |
| JP | 2007-066888 A | 3/2007 |
| JP | 2009-047802 A | 3/2009 |
| KR | 20090057234 A | 6/2009 |

\* cited by examiner

LIGHT GUIDE PANEL, SURFACE LIGHT SOURCE APPARATUS INCLUDING LIGHT GUIDE PANEL, AND FLAT PANEL DISPLAY INCLUDING SURFACE LIGHT SOURCE APPARATUS

CROSS-REFERENCE TO RELATED APPLICATIONS

This application claims the benefit of Japanese Patent Application No. 2011-0140649, filed on Jun. 24, 2011, and Korean Patent Application No. 10-2012-0005277, filed Jan. 17, 2012, the disclosure of each of which is incorporated herein in its entirety by reference.

BACKGROUND

1. Field

The present disclosure relates to display apparatuses and more particularly, to light guide panels, surface light source apparatuses including the light guide panels, and/or flat panel displays including the surface light source apparatuses.

2. Description of the Related Art

Liquid crystal displays used in personal computers (PCs), computer monitors, liquid crystal display (LCD) TVs, mobile communication terminals, or the like are light-receiving displays that do not emit light by themselves but display images by selectively transmitting light irradiated from the outside. Thus, a backlight is included on a rear surface of the liquid crystal displays as a surface light source apparatus.

In the liquid crystal displays, light emitted from the surface light source apparatus transmits through a liquid crystal layer arranged between a pair of polarization plates that have transmission axes at right angles to each other. An image is displayed as the light that transmits through the liquid crystal layer is electrically turned on or off.

An absorption-type polarization plate is used as the polarization plates. In the absorption-type polarization plate, an iodine-colored uniaxially oriented polyvinyl alcohol film is used as a polarizer. A protection film such as triacetyl cellulose film or the like, and a coating layer formed of an acrylic resin, or a phase difference film such as norbornene or polycarbonate is formed on one or both sides of the polarizer.

The absorption-type polarization plate transmits only light in a direction of a transmission axis of the polarization plate and absorbs the other components of light. Thus, in principle, light usage efficiency thereof (light transmittance) does not exceed 50%. Moreover, considering that reflectivity of an inner surface of the absorption-type polarization plate is 4%, the light usage efficiency of the absorption-type polarization plate is 46% at the greatest. Thus, to achieve low power consumption by liquid crystal displays, an efficient use of the backlight and an improvement in luminance are desirable.

As one of the methods for solving the above-described problem, a reflective polarization plate that uses optical reflection and interference is known. The reflective polarization plate reflects a desired polarization component light and transmits polarization of the opposite property to the desired polarization component light.

An axis of the reflective polarization plate is adjusted such that only polarization in a transmission axis direction is transmitted so that the light transmitted through the reflective polarization plate remains the same as linear polarization, and at the same time, the absorbed polarization is reflected for reuse in the absorption-type polarization plate. Thus, light usage efficiency of light emitted from the backlight may be improved.

An example of the reflective polarization plate is a dual brightness enhancement film (DBEF) including refractive index isotropic layers and refractive index anisotropic layers that are alternately stacked. However, a DBEF requires polymer films of several hundreds of stacked layers in total in order to provide polarization over a visible region. Thus, precise control is needed and this increases manufacturing costs.

To improve light usage efficiency and polarization separation power more cost-effectively, a technique of using a polarization sensitive scattering element (PSSE) is being researched. For example, Prior Art 1 (Japanese Patent Publication No. Hei 11-502036) discloses a method in which a polarization component in a direction perpendicular to a transmission axis is scattered to the backside by using a PSSE, and a polarization state of a corresponding backside scattering component is converted by using a ing s of stacked lay In addition, Prior Art 2 (Japanese Patent Publication No. 2009-047802) discloses a reflective polarization plate in which a birefringent body formed of fibers having birefringence is used as a PSSE. In the reflective polarization plate, a layer in which a refractive index in a cross-sectional direction of the birefringent body (ordinary ray refractive index) corresponds to a refractive index of a supporting medium (polarization layer A) and a layer (polarization layer B) in which a refractive index in a length direction of the birefringent body (ordinary ray refractive index) corresponds to a refractive index of a supporting medium are alternately stacked such that arrangement directions of the birefringent bodies cross each other. Accordingly, polarization separation with respect to light that is obliquely incident or diffused light is improved.

In addition, Prior Art 3 (Japanese Patent Publication No. 2006-517720) discloses a method of improving polarization separation efficiency by scattering only one component of polarization and emitting the same to the outside by integrating an isotropic resin layer, in which birefringence fibers are buried as a PSSE, into a light guide panel.

To reduce power consumption of the surface light source apparatuses, LEDs having a long life span and power consumption reduction effect are frequently used as a backlight.

SUMMARY

At least one example embodiment including light guide panels for improving polarization separation efficiency and preventing luminance spots even when a discontinuous light source is disposed on a cross-section of the light guide panels is provided.

At least one example embodiment including surface light source apparatuses including the light guide panels is provided.

At least one example embodiment including flat panel displays including the surface light source apparatuses as a light source apparatus is provided.

Additional example embodiments will be set forth in part in the description that follows and, in part, will be apparent from the description, or may be learned by practice of the presented example embodiments.

According to an example embodiment, a light guide panel includes: a light guide layer including a light incident surface; a polarization separation layer configured to select a desired polarization among light emitted from the light guide layer and to emit light having the polarization; and a light homogenization layer including a plurality of first fibers and a first supporting medium of the first fibers, the light homogenization layer configured to diffuse and scatter light incident on the light guide layer into the light guide layer.

The polarization separation layer may include: a plurality of second fibers having birefringence; and a second supporting medium that is isotropic and configured to support the second fibers.

A refractive index of the second supporting medium may correspond to at least one of two different refractive indices of the second fibers.

The plurality of first fibers have birefringence and the first supporting medium is isotropic and configured to support the first fibers.

A refractive index of the first supporting medium may be different from at least one of the two different refractive indices of the first fibers.

A surface roughness Rz of an outer circumferential surface of the second fibers may be from about 0.1 μm to about 10 μm.

The second fibers may have a polygonal cross-section in a radius direction.

One of the light guide layer, the polarization separation layer, and the light homogenization layer may be between the remaining two layers.

The light guide panel may further include: a phase difference plate configured to convert a polarization direction of light in the light guide layer; and a reflection plate on a surface except the light incident surface and a light emitting surface of the light guide layer, the reflection plate configured to reflect light emitted from the light guide layer back into the light guide layer.

The polarization separation layer and the light homogenization layer may be stacked on the light emitting surface of the light guide layer. The polarization separation layer and the light homogenization layer may be integrated into a single layer. In the single layer, the first fibers and the second fibers may alternate, and a third supporting medium may include the first and second supporting media that supports the first and second fibers.

The first fibers and the second fibers may be different materials.

The light guide layer may be a same material as at least one of the first and second supporting media.

A density of the second fibers may be higher away from the light incident surface.

A density of the first fibers may vary according to arrangement positions.

Some of the plurality of first and second fibers may include discontinuous portions.

Portions of the plurality of first and second fibers may be overlapped.

According to another example embodiment, a surface light source apparatus including: a light source unit including a plurality of light sources spaced apart from one another; and a light guide panel configured to emit light having a polarization component of light incident from the light source unit, wherein the light guide panel is one described above.

A density of the first fibers may be higher between the plurality of light sources.

The plurality of light sources may be on two opposite sides of the light guide panel.

According to another example embodiment, a flat panel display includes: a light source apparatus; and a liquid crystal panel configured to display an image by using light supplied from the light source apparatus, wherein the light source apparatus is the surface light source apparatus described above.

According to some example embodiments, light is scattered and diffused at various angles in an in-plane direction via a light homogenization layer in which first fibers extended vertically to an incident surface are arranged. Thus, even when a discontinuous light source is used, uniform luminance may be obtained.

By using a polarization separation layer in which second fibers extended parallel to an incident surface are arranged, only desired polarization components may be selectively emitted with a high polarization separation efficiency.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
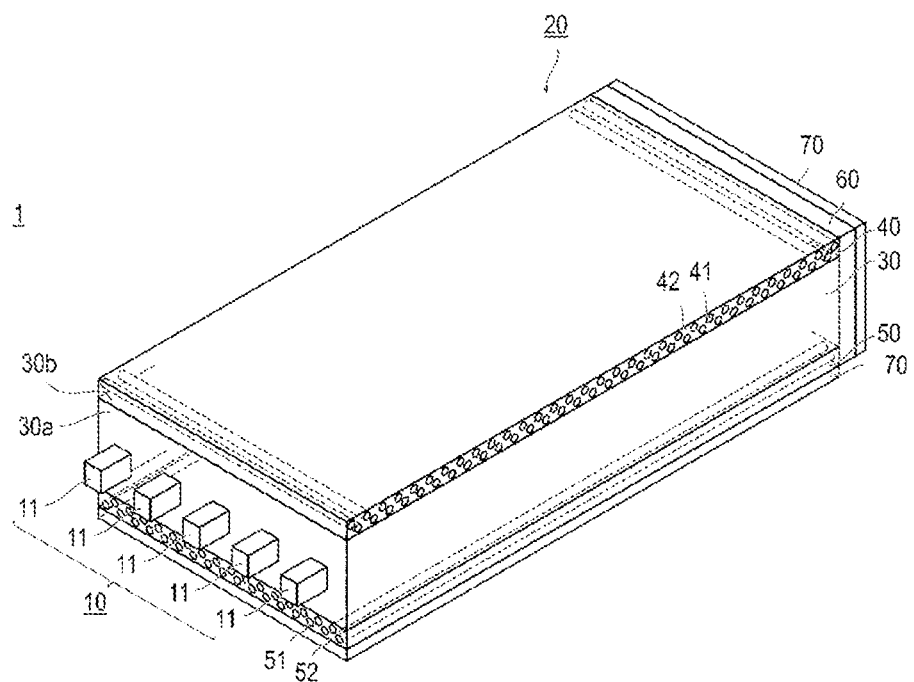
FIG. 1 is a perspective view of a surface light source apparatus according to an example embodiment.

Reference will now be made in detail to example embodiments, examples of which are illustrated in the accompanying drawings, wherein like reference numerals refer to like elements throughout. In this specification, thicknesses of layers or regions illustrated in the drawings are exaggerated for clarity of description. In addition, measurement ratios in the drawings are exaggerated for convenience of description and may vary from actual ratios. In this regard, the example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

When a (e.g., layer, region, or plate) is referred to as being herein "on," "connected to," or "coupled to" another member, the member may be directly on, or connected or coupled to the another member or intervening member(s) between the member and the another member may be present.

A surface light source apparatus according to some example embodiments will be described.

FIG. 1 is a perspective view of a surface light source apparatus 1 according to an example embodiment.

Figure 2A:
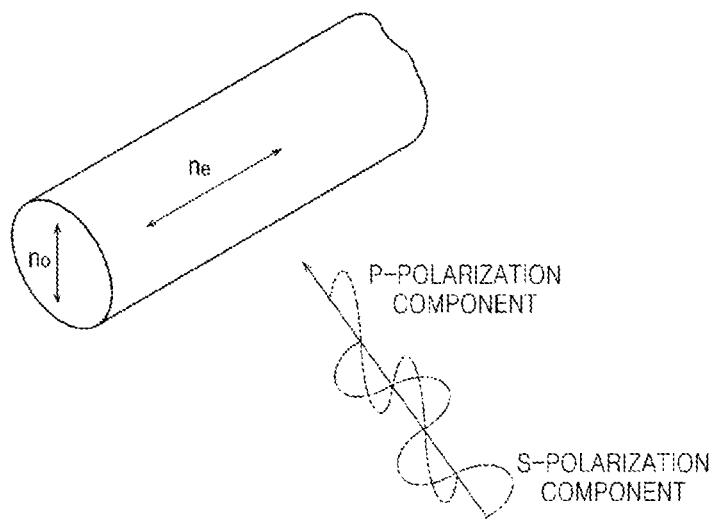
FIGS. 2A and 2B are schematic views illustrating an example of a relationship between a fiber and a refractive index.
Figure 2B:
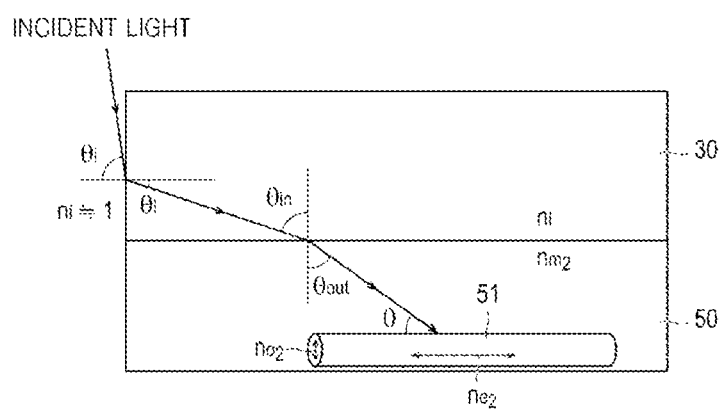
Figure 3:
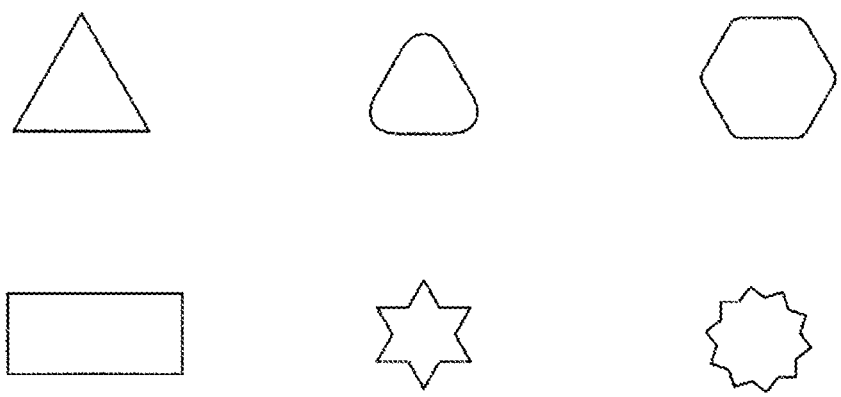
FIG. 3 is a cross-sectional view illustrating a modified example of a cross-section of the fiber shown in FIG. 2A.

FIGS. 2A and 2B are schematic views illustrating an example of a relationship between a fiber and a refractive index, and FIG. 3 is a cross-sectional view illustrating a modified example of a cross-section of the fiber.

As illustrated in FIG. 1, the surface light source apparatus 1 is an edge light type surface light source apparatus. The surface light source apparatus 1 includes a light source unit 10 and a light guide panel 20 transmitting a desired polarization component among the light emitted from a plurality of light sources 11 of the light source unit 10. In an example embodiment, light is emitted as surface emission from the surface light source apparatus 1 in an upward direction of FIG. 1. Although not shown in FIG. 1, when the surface light source apparatus 1 is applied to a liquid crystal display, a liquid crystal unit may be arranged on a surface of the surface light source apparatus 1 from which light is emitted.

The light source unit 10 emits light to be supplied in the surface light source apparatus 1 and the light source unit 10 is on a side of the light guide panel 20. The light source unit 10 includes a plurality of light sources 11 arranged at intervals. The intervals between the plurality of light sources 10 may be regular or irregular.

While the plurality of light sources 11 are arranged one-dimensionally in FIG. 1, they may also be arranged two-dimensionally. For example, the plurality of light sources 11 may be point light-emitting diodes (LEDs).

The light guide panel 20 may include a rectangular parallelepiped plate. The light guide panel 20 includes a light guide layer 30, a polarization separation layer 40 stacked on the light guide layer 30, a light homogenization layer 50 stacked on the light guide layer 30, and a phase difference plate 60 and a reflection plate 70 on the light guide layer 30. The polarization separation layer 40 and the light homogenization layer 50 face each other with the light guide layer 30 interposed therebetween. The light guide layer 30 allows light emitted from the light source 11 to be incident to an incident surface 30a, which is a side surface thereof, and enter the light guide panel 20. The entered light is propagated in the light guide layer 30 and only a desired polarization component is selectively emitted from the polarization separation layer 40. The light guide layer 30 may be formed of a transparent material capable of transmitting incident light. The transparent material may be, for example, an optical isotropic material such as polymethyl methacrylate (PMMA) or polycarbonate (PC). The polarization separation layer 40 is stacked on the light guide layer 30. The polarization separation layer 40 derives desired polarization among the light in the light guide layer 30 from a light emitting surface 30b of the light guide layer 30, which is a principal surface of the light guide layer 30 on a side. The polarization separation layer 40 reflects polarization light that is perpendicular to this derived polarization. The polarization separation layer 40 may be on an outer surface of the light guide layer 30 but is not limited thereto.

The polarization separation layer 40 may include a first fiber 41 and a first supporting medium 42 that supports the first fiber 41. For example, the first fiber 41 may extend parallel to the incident surface 30a of the light guide layer 30, or may extend in a direction which is inclined by about ±45° with respect to the direction parallel to the incident surface 30a. The first fiber 41 may be provided in plural. That is, the polarization separation layer 40 may include a plurality of first fibers 41. The light homogenization layer 50 is stacked on the light guide layer 30. The light homogenization layer 50 homogenizes a light direction by diffusing light in the light guide layer 30 in an in-plane direction, for example, in a direction perpendicular to a light propagation direction. The light homogenization layer 50 includes a second fiber 51 and a second supporting medium 52 that supports the second fiber 51. For example, the second fiber 51 may extend in a direction perpendicular to the incident surface 30a of the light guide layer 30, or may extend in a direction which is inclined by about ±45° with respect to the direction perpendicular to the incident surface 30a.

The light homogenization layer 50 includes a plurality of second fibers 51. The plurality of second fibers 51 are parallel to the incident surface 30a of the light guide layer 30. For example, the second fibers 51 are arranged in a direction perpendicular to the arrangement direction of the first fibers 41 of the polarization separation layer 40. The first and second fibers 41 and 51 of the polarization separation layer 40 and the light homogenization layer 50 have birefringence. The first and second fibers 41 and 51 have an extraordinary ray refractive index ne and an ordinary ray refractive index no. The refractive index ne is greater than the refractive index no.

The relationship between refractive indices of the first and second fibers 41 and 51 will be described below with reference to FIGS. 2A and 2B.

As illustrated in FIGS. 2A and 2B, the first and second fibers 41 and 51 have the ordinary ray refractive index no in a cross-sectional direction that is smaller than the extraordinary ray refractive index ne in a length direction. The first and second fibers 41 and 51 may be formed of various materials having birefringence. For example, a polymer fiber that is prepared by extending a polymer may be used for a stable cross-section, excellent durability, and easy orientation characteristics.

Examples of the polymer fiber may include polyolefin fibers such as polyethylene (PE), polytetrafluoroethylene (PTFE), polypropylene (PP); polyvinyl fibers such as polyfluorinated vinylidene (PVdF), polyfluorinated vinyl (PVF), polyvinyl chloride (PVC), or polyvinyl alcohol; and acrylic fibers such as polyacrylonitrile (PAN).

The polymer fiber may be aliphatic polyamide fiber such as Nylon 6 (N6), Nylon 6,6 (N66), Nylon 4,6 (N46), or Nylon 6,10 (N610); aromatic polyamide fibers (aramid fiber) such as poly(m-phenyleneisophthalamide) (PMPIA) or poly(p-phenylene terephthalamide) (PMPTA); or polyester fibers such as polyethylene terephthalate (PET), polyethylene naphthalate (PEN), or poly-),caprolactone.

The polymer fiber may be animal fibers such as silk, wool, or cobweb, or cellulose vegetable fiber such as cupra, rayon fibers, etc. The types of the first fiber 41 and the second fiber 51 may be selected to satisfy the relationship between refractive indices that will be described below, or the same or different types may be used. Various types of fibers may be used in the polarization separation layer 40 or the light homogenization layer 50.

The first and second fibers 41 and 51 may be formed of a polymer fiber. This polymer has a great refractive index difference Δn between an extraordinary ray refractive index ne and an ordinary ray refractive index no. The larger the refractive index difference Δn is, the more improved polarization separation efficiency of the polarization separation layer 40 or light diffusion efficiency of the light homogenization layer 50 may be. The difference Δn in the refractive indices may be 0.03 or greater, and for example, 0.05 or greater or 0.1 or greater.

The extraordinary ray refractive index ne and the ordinary ray refractive index no of the polymer fiber may be controlled by adjusting a tensioning speed of a polymer, or a tensioning rate thereof, a material of the polymer, a thickness (diameter) or density of a fiber.

Table 1 below shows an extraordinary ray refractive index ne and an ordinary ray refractive index no of representative draft polymer fibers. The refractive indices of Table 1 are calculated by dipping a fiber in liquids of various refractive indices, adjusting a liquid that is invisible as fiber lines are assimilated with the liquid by using a polarization microscope, and measuring the refractive index of the adjusted liquid using Atagosa Digital Abbe Refraction System DRA1 (wavelength: 589 nm). The refractive index of the adjusted liquid may be measured with respect to each of transmission axes of polarization to measure no and ne.

TABLE 1

Ordinary ray refractive index no and extraordinary ray refractive index ne of representative polymer fibers

| Material | Abbreviation | Thickness (μm) | no | ne | Δn |
|---|---|---|---|---|---|
| Nylon 6 | N6 | 75 | 1.5182 | 1.6228 | 0.1046 |
| Nylon 6 | N6 | 90 | 1.5182 | 1.6104 | 0.0922 |
| Nylon 6,10 | N610 | 50 | 1.5217 | 1.5711 | 0.0494 |
| Nylon 6,10 | N610 | 100 | 1.5217 | 1.5711 | 0.0494 |
| Nylon 6,6 | N66 | 100 | 1.5182 | 1.5971 | 0.0789 |
| Polyfluorinated vinylidene | PVdF | 70 | 1.4193 | 1.4501 | 0.0308 |
| Polyethylene terephthalate | PET | 16 | 1.5449 | 1.7200 | 0.1751 |

Thicknesses of the first and second fibers 41 and 51 may vary. The thicknesses of the first and second fibers 41 and 51 may be controlled according to a size of a display to which they are applied. The thicknesses of the first and second fibers 41 and 51 may be controlled to have desired refractive indices. For example, the thicknesses of the first and second fibers 41 and 51 may be from about 1 μm to about 200 μm.

The intervals between the first and second fibers 41 and 51 may vary. The intervals between the first and second fibers 41 and 51 may be selected according to a size of a display and to be smaller than a pixel pitch of a liquid crystal display to which the first and second fibers 41 and 51 are applied. The intervals between the first and second fibers 41 and 51 may be regular or irregular. The first and second fibers 41 and 51 may have a single-layer structure or a multi-layer structure.

The first fibers 41 may be arranged with uniform or non-uniform density. For example, the first fibers 41 may be arranged with a density that increases away from the light sources 11. For example, a density of the first fibers 41 in the polarization separation layer 40 may increase continuously or stepwise away from the light sources 11. A light amount is reduced away from the light sources 11. Accordingly, in an area with a small light amount and away from the light sources 11, the first fibers 41 may be densely arranged. In an area with a large light amount near the light sources 11, the first fibers 41 may be coarsely arranged. Accordingly, a uniform light may be emitted over the entire image plane (light-emitting surface) of the light guide panel 20.

Lengths of the first and second fibers 41 and 51 may be determined according to a size of the polarization separation layer 40 or a size of the light homogenization layer 50 in which the first and second fibers 41 and 51 are arranged. The lengths of the first and second fibers 41 and 51 are not limited to being continuous in a longitudinal direction of the polarization separation layer 40 or the light homogenization layer 50. For example, some portions of the first and second fibers 41 and 51 may be removed and discontinuous portions may be present. Some of the first and second fibers 41 and 51 may be overlapped. The first and second fibers 41 and 51 may have a circular cross-section as illustrated in FIG. 1 but are not limited thereto, and may have a different cross-section. For example, as illustrated in FIG. 3, the first and second fibers 41 and 51 may have a regular or irregular polygonal cross-section such as a triangular, rectangular, or hexagonal cross-section, or a cross-section formed by combining a curved line and a straight line. "Polygonal cross-section" includes not only figures respective sides of which formed by straight lines, but also figures respective sides of which are formed by curved lines. For example, polygonal cross-sections of the first and second fibers 41 and 51 may have some curved lines on each side or on each vertex, and these cross-sections are also included in the above-described "polygonal cross-section."

As will be described below, in the polarization separation layer 40, only a desired polarization component of light is selectively scattered by the first fibers 41, and emitted from the light emitting surface 30b. The light is likely to scatter in a light guide direction, and thus, the amount of scattered light in a direction perpendicular to a light proceeding direction is reduced.

When a surface light source apparatus including a light guide panel according to an example embodiment is used as a backlight of a liquid crystal display, and if the first fibers 41 have a polygonal cross-section, various scattering angles are formed, and thus scattering of light may increase in a direction perpendicular to the light guide direction. As a result, light with a more uniform angle distribution may be obtained.

Forms of external circumferential surfaces of the first and second fibers 41 and 51 may vary. Surface roughness Rz of an outer circumferential surface of the first fibers 41 may be from about 0.1 μm to about 10 μm. Various light scattering angles are formed by the first fibers 41, and thus, light with a more uniform angle distribution may be obtained. The e, tlight scattering angles are formed by the first fibers 41, and thus, lined based on JIS B 0601-2001.

The first and second supporting media 42 and 52 support the first and second fibers 41 and 51, respectively, and may be formed of an optically isotropic material. Accordingly, the first and second supporting media 42 and 52 may be formed of any material that has excellent adhesiveness with respect to the first and second fibers 41 and 51 and optical transparency. For example, the first and second supporting media 42 and 52 may be formed of a curable resin that is polymerable/linkable by heat or radiation.

The curable resin may be, for example, a UV-curing resin formed of a compound including, for example, an acryloyl group, a methacryloyl group, a vinyl group, an aryl group, a styryl group, a thiol group, an epoxy group, a vinyl ether group, or an oxetanyl group.

The curable resin may be a thermosetting resin formed of silicon resin, aryl ester, acrylic resin, epoxy resin, polyimide, or urethane resin.

The curable resin may be a compound of the UV-curing resin and the thermosetting resin.

The first and second supporting media 42 and 52 may be formed of an acrylic resin such as PMMA; a polyolefin resin such as PE, PP, or cycloolefin polymer (COP); a polyester resin such as PET; a polyether such as polyphenylene oxide (PPO); a vinyl resin such as polyvinyl alcohol; polystyrene, PC, polyurethane, polyamide, polyimide, or epoxy resin; a copolymer including at least two types of monomers forming these materials; or a blend of these polymers.

By mixing a plurality of resins, refractive indices (nm) of the first and second supporting media 42 and 52 may be controlled as desired.

The polarization separation layer 40 may be formed such that a refractive index nm1 of the first supporting medium 42 matches an ordinary ray refractive index no1 or an extraordinary ray refractive index ne1 of the first fiber 41.

An example embodiment in which the refractive index nm1 of the first supporting medium 42 and the ordinary ray refractive index no1 of the first fiber 41 match each other will be described.

In this specification, "the refractive indexes nA and nB match each other" means that the refractive indexes nA and nB match each other with a precision to the second decimal point or greater, and this may also indicate that the refractive indexes nA and nB match each other with a precision to the third decimal point or greater.

The light homogenization layer 50 may be formed such that a refractive index nm2 of the second supporting medium 52 is different from at least one of an ordinary ray refractive index no2 and an extraordinary ray refractive index ne2 of the second fiber 51.

An example embodiment in which the refractive index nm2 of the second supporting medium 52 is different from both the ordinary ray refractive index no2 and the extraordinary ray refractive index ne2 of the second fiber 51 will be described.

A phase difference plate 60 is opposite to the incident surface 30a of the light guide layer 30, and converts a polarization direction of light propagating in the light guide layer 30. The phase difference plate 60 may be, for example, a λ/4 plate that shifts a phase by λ/4. The phase difference plate 60 may be included selectively. Thus, the phase difference plate 60 may also be omitted.

The reflection plate 70 prevents light in the light guide layer 30 from leaking to other portions except through the light emitting surface 30b. To this end, the reflection plate 70 is stacked on a side except the incident surface 30a of the light guide layer 30 or on a principal surface of the light guide layer 30 that is opposite to the light emitting surface 30b. The reflection plate 70 is stacked on the phase difference plate 60 or the light homogenization layer 50. Although not shown in the drawings, the reflection plate 70 may also be formed on two surfaces besides the incident surface 30a of the light guide layer 30 and the opposite surface to the incident surface 30a. Also, although not shown in the drawings, the reflection plate 70 may be disposed between the plurality of light sources 11 or on or under the light sources 11.

The principle of surface emission of light from a light source in the surface light source apparatus 1 will be described.

Figure 4A:
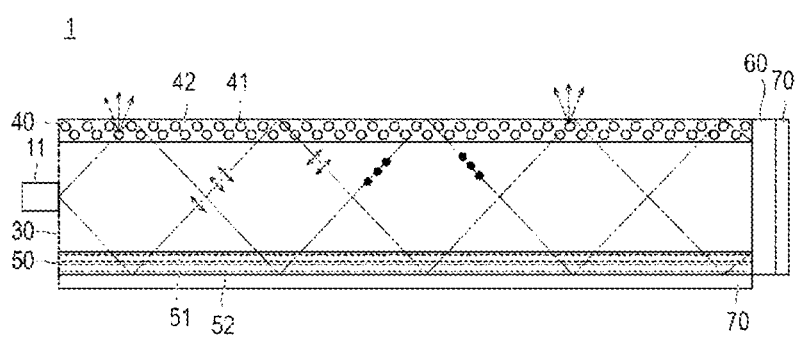
FIG. 4A is a right-side cross-sectional view illustrating the surface light source apparatus of FIG. 1.
Figure 4B:
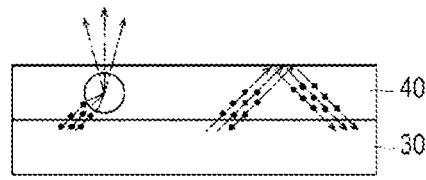
FIG. 4B is an expanded view of FIG. 4A illustrating propagation of an S-polarization component incident to a polarization separation layer.
Figure 4C:
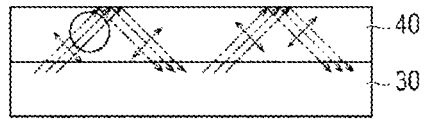
FIG. 4C is an expanded view of FIG. 4A illustrating propagation of a P-polarization component incident to the polarization separation layer.

FIG. 4A is a right-side cross-sectional view illustrating the surface light source apparatus 1 of FIG. 1. FIG. 4B is an expanded view of FIG. 4A illustrating an example of propagation of an S-polarization component incident to the polarization separation layer 40. FIG. 4C is an expanded view of FIG. 4A illustrating an example of propagation of a P-polarization component incident to the polarization separation layer 40.

As illustrated in FIG. 4A, light is incident from the light source 11 on the incident surface 30a of the light guide layer 30. The incident light propagates through the light guide layer 30 by repetitive internal reflection on interfaces between the polarization separation layer 40, the light homogenization layer 50, and the phase difference plate 60 as denoted by a chain line or a long-and-short broken line. Light is reflected by the reflection plate 70 that is attached outside the phase difference plate 60, below the light homogenization layer 50, and on a side of the light guide layer 30, and thus, is not leaked except through the light emitting surface 30b but is propagated further in the light guide layer 30.

Light emitted from the light source 11 is natural light, and various polarization components are mixed in the light. Hereinafter, the chain line with black circles in FIGS. 4A through 4C denotes a P-polarization component that vibrates on a plane such as a ground surface. The long-and-short broken line with arrows denotes an S-polarization component that vibrates on the plane perpendicular to the ground surface. The S-polarization component is selectively emitted from the light emitting surface 30b by the polarization separation layer 40.

As described above, the polarization separation layer 40 includes the first fibers 41. As illustrated in FIG. 2A, the first fibers 41 have an extraordinary ray refractive index ne1 in a length direction and an ordinary ray refractive index no1 in a cross-sectional direction. The S-polarization component vibrates on a plane that is parallel to a cross-section of the first fibers 41 along the length direction. Accordingly, the S-polarization component may be affected by the extraordinary ray refractive index ne1 in the length direction of the first fibers 41, but not by the ordinary ray refractive index no1 in the cross-sectional direction.

On the other hand, as the P-polarization component vibrates on a plane parallel to the cross-section of the first fibers 41, it may be affected by the ordinary ray refractive index no1 of the first fibers 41 in the cross-sectional direction. However, the P-polarization component is not affected by the extraordinary ray refractive index ne1 of the first fibers 41 in the length direction.

The first supporting medium 42 that supports the first fibers 41 is formed to correspond to the refractive index of the first fibers 41. Accordingly, when light is incident from the first supporting medium 42 to the first fibers 41 or from the first fibers 41 to the first supporting medium 42, a P-polarization component propagates in a material of the same refractive index. Accordingly, the P-polarization component of light proceeds straight without being affected by the refractive index. In other words, the P-polarization component of light may propagate inside the first supporting medium, 42 in the same manner as when the first fibers 41 are not included. Accordingly, the P-polarization component denoted by the chain line of FIG. 4 is not refracted by the first fibers 41, and thus, is reflected under an internal total reflection condition of the first supporting medium 42.

On the other hand, the first supporting medium 42 has a refractive index that is different from the refractive index of the first fibers 41. Accordingly, when light is incident from the first supporting medium 42 to the first fibers 41 or from the first fibers 41 to the first supporting medium 42, the S-polarization component propagates in a material of a different refractive index. Accordingly, the S-polarization component is affected by the refractive index and is refracted or reflected. The S-polarization component denoted by the long-and-short broken line of FIG. 4 is refracted or reflected by the first fibers 41 and a portion thereof deviates from an internal total reflection condition of the first supporting medium 42 and is incident on an interface at an acute angle and is emitted from the first supporting medium 42.

By stacking the polarization separation layer 40 on the light guide layer 30, only an S-polarization component may be selectively scattered and be emitted from the light emitting surface 30b. As a result, a polarization component that is necessary for a liquid crystal unit may be selectively emitted.

Above is described the first supporting medium 42 having a refractive index nm1 that corresponds to the ordinary ray refractive index no1 of the first fibers 41 and that is different from the extraordinary ray refractive index ne1 of the first fibers 41.

However, the refractive index nm1 of the first supporting medium 42 may be formed to correspond to the extraordinary ray refractive index ne1 and to the ordinary ray refractive index no1 of the first fibers 41. In this case, only a P-polarization component may be selectively scattered to be emitted from the light emitting surface 30b. However, scattering efficiency may be improved when using an S-polarization component that does not vibrate within the same plane as the light guide direction of light instead of using a P-polarization component that vibrates in the same plane of the light guide direction of light. Accordingly, the refractive index nm1 of the first supporting medium 42 may be set to correspond to the ordinary ray refractive index no1 of the first fibers 41.

Figure 5:
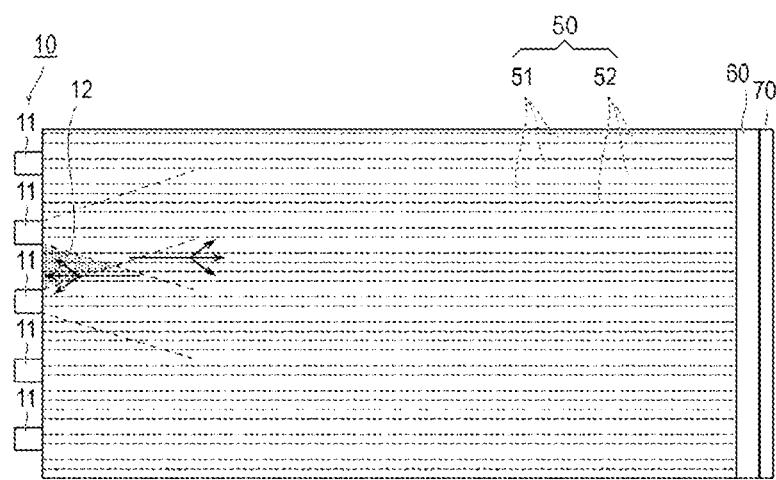
FIG. 5 is a bottom view of the surface light source apparatus of FIG. 1.

The principle of diffusing light in the light guide layer 30 in an in-plane direction by using the light homogenization layer 50 will be described below. FIG. 5 is a bottom view of the surface light source apparatus 1 of FIG. 1.

As illustrated in FIG. 5, the light sources 11 formed of LEDs emit light as a point light source. Thus, a light amount between adjacent light sources 11 may be reduced and dark portions may be generated in an area 12 near the light sources 11. As light propagating in the light guide layer 30 is scattered in the in-plane direction, light direction distribution in the light guide layer 30 may be homogenized. Accordingly, some of the dark portions may disappear.

The light homogenization layer 50 includes the second fibers 51 as described above. The second fibers 51 include an extraordinary ray refractive index $ne_2$ in a length direction and an ordinary ray refractive index $no_2$ in a cross-sectional direction. The second fibers 51 are arranged such that a length direction thereof corresponds to a light guide direction of light. Accordingly, light incident on the second fibers 51 is influenced by the ordinary ray refractive index no1 and the effective extraordinary ray refractive index ne2_eff.

As illustrated in FIG. 2B, when light that is guided in the length direction of the second fibers 51 in the light homogenization layer 50 is incident to the second fibers 51 at an incident angle θ, the effective extraordinary ray refractive index $ne_{2\_eff}$ may be expressed as Equation (A):

$$ne_{2\_eff} = \frac{ne_2 \cdot no_2}{\sqrt{ne_2^2\cos^2\theta + no_2^2\sin^2\theta}} \quad (A)$$

In Equation (A), $no_2$ denotes the ordinary ray refractive index of the second fibers 51, and $ne_2$ denotes the extraordinary ray refractive index of the second fibers 51, and θ denotes an incident angle of light with respect to the second fibers 51 (length direction).

The P-polarization component vibrates along a plane parallel to a cross-section of the second fibers 51 in the length direction. Accordingly, the P-polarization component may be influenced by the effective extraordinary ray refractive index ne2_eff of the second fibers 51 in the length direction, but is not influenced by the ordinary ray refractive index no2 along the cross-sectional direction.

On the other hand, the S-polarization component vibrates along the plane parallel to the cross-section of the second fibers 51. Accordingly, the S-polarization component may be influenced by the ordinary ray refractive index no2 of the second fibers 51 in the cross-sectional direction but is not influenced by the effective extraordinary ray refractive index ne2_eff of the second fibers 51 in the length direction.

When light is incident from the second supporting medium 52 to the second fibers 51 or from the second fibers 51 to the second supporting medium 52, the P-polarization component is influenced by the effective extraordinary ray refractive index ne2_eff and is refracted or reflected, and the S-polarization component is influenced by the ordinary ray refractive index no2 and is refracted or reflected. The second fibers 51 are arranged in the light homogenization layer 50 such that the length direction thereof is parallel to the light guide direction. Accordingly, an interface between the second fibers 51 and the second supporting medium 52 does not lie at a right angle to the light guide direction, and when the P-polarization component or the S-polarization component is refracted or reflected in the corresponding interface, angle distribution in the in-plane direction of light varies. In other words, light may be inclined on the right and left sides of the light guide direction. Accordingly, light propagating in the light guide layer 30 is scattered and diffused at various angles, thereby homogenizing the light direction distribution.

Light is refracted and extended only in a horizontal, left and right direction in the light homogenization layer 50, but the angle in a vertical direction does not vary. Accordingly, both of the P- and S-polarization components do not satisfy the total internal reflection condition due to the light homogenization layer 50. For example, light extends in the horizontal, left and right direction in the light homogenization layer 50 so as to remove only spots of an LED, and a refraction angle in the vertical direction in the polarization separation layer 40 varies such that only the S-polarization component may be emitted from the polarization separation layer 40. Accordingly, a desired polarization component may be emitted from the light guide panel, and also light spots of the LED may be removed.

To perform the light homogenizing function, the refractive index nm2 of the second supporting medium 52 may be different from the ordinary ray refractive index no2 and the extraordinary ray refractive index net of the second fibers 51.

However, the light homogenization layer 50 may be act more intensely as a homogenization layer of S-polarization.

The ordinary ray refractive index no2 and the refractive index nm2 of the second supporting medium 52 may have a difference of 0.03 or greater, and for example, 0.05 or greater or 0.1 or greater.

To scatter and diffuse both the S- and P-polarization components with a proper balance, the ordinary ray refractive index no2 and the extraordinary ray refractive index ne2 of the second supporting medium 52 and the refractive index nm2 of the second supporting medium 52 may satisfy Equation (1) below:

$$no_2 < nm_2 < ne_2 \quad (1)$$

In particular, the refractive index nm2 of the second supporting medium 52 and the effective extraordinary ray refractive index ne2_eff of the second fibers 51 may satisfy Equation (2) below:

$$no_2 < nm_2 < ne_{2\_eff} \quad (2)$$

The refractive index nm2 of the second supporting medium 52 may satisfy Equation (3) below. The refractive index nm2 of the second supporting medium 52 is smaller than the effective extraordinary ray refractive index ne2_eff of the second fibers 51, and thus the P-polarization component may be scattered and diffused. Accordingly, the second supporting medium 52 may function as a light homogenization layer that effectively scatters and diffuses both the P- and S-polarization.

$$no_2 < nm_2 < \sqrt{\frac{ne_2^2 \cdot no_2^2 - ne_2^2 \cdot nl^2 + no_2^2 \cdot nl^2 + ne_2^2 - no_2^2}{no^2}} \quad (3)$$

In Equation (3), no2 denotes the ordinary ray refractive index of the second fibers 51, and ne2 denotes the extraordinary ray refractive index of the second fibers 51, and nl denotes the refractive index of the light guide layer 30.

Equation (3) is derived from Equation (2) and Equation (A) and Equations (B) through (F).

$$\frac{\sin\theta_i}{\sin\theta_1} = \frac{nl}{ni} \approx nl \quad (B)$$

$$\frac{\sin\theta_{in}}{\sin\theta_{out}} = \frac{nm_2}{nl} \quad (C)$$

$$\theta = \frac{\pi}{2} - \theta_{out} \quad (D)$$

$$\theta_1 = \frac{\pi}{2} - \theta_{in} \quad (E)$$

$$ne_{2\_eff} = \sqrt{\frac{ne_2^2 \cdot no_2^2 - ne_2^2 \cdot nl^2 + no_2^2 \cdot nl^2 + ne_2^2 - no_2^2}{no^2}} \quad (F)$$

In Equations (B) through (F) above, $no_2$ denotes the ordinary ray refractive index of the second fibers 51, ne2 denotes the extraordinary ray refractive index of the second fibers 51, ni denotes a refractive index of an external medium of the light guide panel 20, nl denotes a refractive index of the light guide layer 30, $\theta i$ denotes an incent angle of light incident on the light guide layer 30, $\theta l$ denotes a refraction angle of light incident on the light guide layer 30, $\theta in$ denotes an incident angle of light incident on the light homogenization layer 50, and $\theta out$ denotes a refraction angle of light incident on the light homogenization layer 50. The light guide panel 20 is usually disposed in air, and a refraction index ni of an external medium of the light guide panel 20 is the same as the refractive index of air(=1) and is expressed by Equation (B).

Equation (F) is derived in Equation (A) by substituting nm2 as nm2=ne2_eff and modifying Equation (A) using Equations (B) through (E). Equation (3) is derived from Equation (2) and Equation (F).

If nm2=ne2_eff, an incident light component ($\theta \approx \pi/2$) having a maximum angle among P-polarization does not proceed linearly without being refracted or reflected by the second fibers 51 of the light homogenization layer 50. Accordingly, the light homogenization layer 50 may not perform the function of light homogenization with respect to the same light component. An effective refractive index of light of the incident light component, which has an angle smaller than the maximum angle, is close to the ordinary ray refractive index no2.

When Equations (B) through (F) are all satisfied, light homogenization with respect to an incident light component incident to the second fibers 51 at all angles θ may be performed.

When nm2 and the refractive index ne2_eff denoted by Equation (F) have a difference in refraction of 0.03 or greater, the effect of the light homogenization layer of the P-polarization component may be further improved.

As illustrated in FIG. 5, a density of the second fibers 51 disposed on a central line between adjacent light sources 11 may be greater than a density of the second fibers 51 disposed on an axis in a light emitting direction of the light source 11 in the light homogenization layer 50. A light amount between adjacent light sources 11 may be reduced and dark portions may be likely to be generated in the area 12 near the light sources 11. Accordingly, by densely arranging the second fibers 51 between the light sources 11, a light homogenization effect may be further improved.

The first fibers 41 are arranged in the polarization separation layer 40 such that the length direction of the first fibers 41 lies at a right angle to a light guide direction. Accordingly, a cross-section of the first fibers 41 in a diameter direction may be substantially uniform in any position. As the first fibers 41 hardly vary in form in the length direction, when the P- or S-polarization component is refracted or reflected by the first fibers 41, light is substantially not scattered on both sides of the light guide direction even when seen from the plane. Light is scattered in the plane according to the light guide direction. Angle distribution in the in-plane direction does not vary substantially.

Light may be scattered in the in-plane direction by the second fibers 51 that extend in a direction perpendicular to the incident surface 30a in the light homogenization layer 50. Accordingly, light may be scattered in the in-plane direction, which may not be performed by using just a PSSE of the first fibers 41 that extend in parallel to the incident surface 30a.

If the S-polarization component is emitted only, light at a phase near to the P-polarization component remains in the light guide layer 30. To also use the remaining light effectively, the phase difference plate 60 is disposed.

In FIG. 1, the phase difference plate 60 is a λ/4 plate and has a thickness changing phases of light that is incident to the phase difference plate 60 at right angles by 90 degrees. Light that is totally reflected internally in the light guide layer 30 is not incident to the phase difference plate 40 at a right angle, as shown in FIG. 4.

Conversely, although the S-polarization component is sometimes converted into the P-polarization component, since the S-polarization component is selectively emitted to the outside, a ratio of conversion from the P-polarization component to the S-polarization component is high. As such, the remaining light in the light guide layer 30 is also converted to the S-polarization component, and thus, emission efficiency of the S-polarization component may be increased and light usage efficiency may be improved as a result.

The phase difference plate 40 may be used according to a wavelength band. For example, a birefringence sheet formed by drawing a film formed of, for example, PC, polysulfide (PS), PMMA, polyvinyl alcohol, polyamide, polyester, etc. or a support sheet of a liquid crystal polymer orientation layer, or a multi-layer stack structure may be used as the phase difference plate 40. A sheet formed by arranging the first or second fibers 41 or 51 used in the polarization separation layer 40 or the light homogenization layer 50 in a supporting medium may be used as the phase difference plate 40.

<Second Embodiment>

Figure 6:
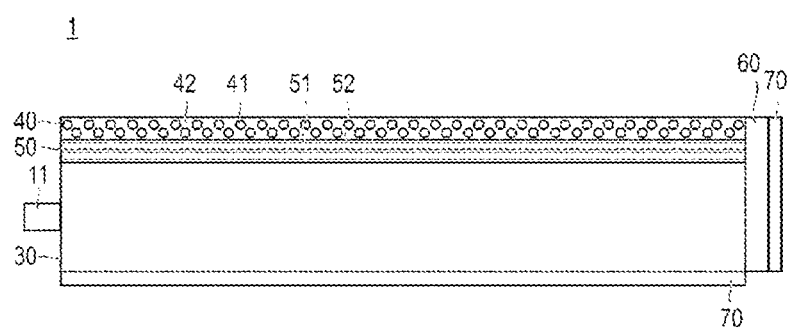
FIG. 6 is a side view of a surface light source apparatus according to another example embodiment.

FIG. 6 is a side view of a surface light source apparatus 1 according to another example embodiment.

In FIG. 4, the light homogenization layer 50 is below the light guide layer 30. However, the position of the light homogenization layer 50 may vary. The light homogenization layer 50 may be stacked on the light guide layer 30. Thus, as in the surface light source apparatus 1 illustrated in FIG. 6, the light homogenization layer 50 may also be between the light guide layer 30 and the polarization separation layer 40.

<Third Embodiment>

Figure 7:
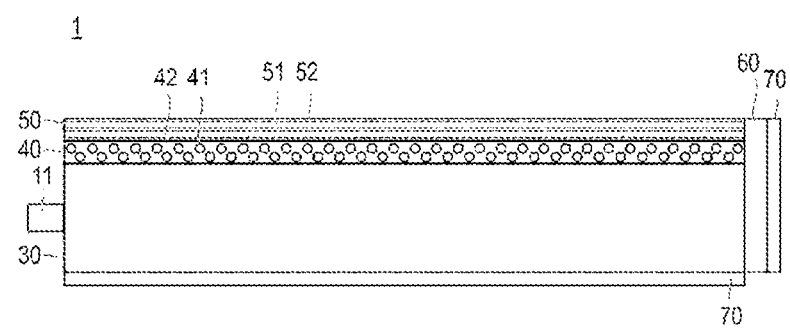
FIG. 7 is a side view of a surface light source apparatus according to another example embodiment.

FIG. 7 is a side view of a surface light source apparatus 1 according to another example embodiment.

In the surface light source apparatus 1 illustrated in FIG. 7, the light homogenization layer 50 may be on the polarization separation layer 40.

<Fourth Embodiment>

Figure 8:
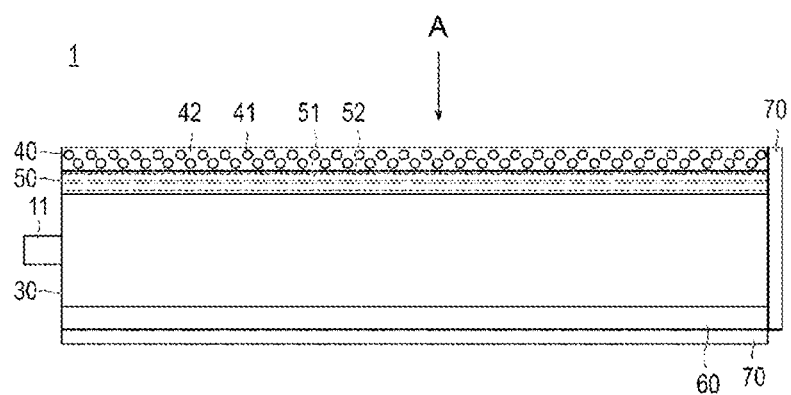
FIG. 8 is a side view of a surface light source apparatus according to another example embodiment.

FIG. 8 is a side view of a surface light source apparatus 1 according to another example embodiment.

Referring to FIG. 4, the phase difference plate 60 is mounted on a side opposite to the incident surface 30a of the light guide layer 30. However, the phase difference plate 60 may be mounted on a principal surface of the light guide layer 30 opposite to a surface on which the polarization separation layer 40 is stacked. Also, the phase difference plate 60 may be mounted on at least one side besides the incident surface 30a of the light guide layer 30.

For example, like the surface light source apparatus 1 illustrated in FIG. 8, the phase difference plate 60 may be disposed on the principal surface of the light guide layer 30 opposite to the surface on which the polarization separation layer 40 is formed, for example, on a lower surface of the light guide layer 30. However, when the phase difference plate 60 is on the principal surface or the side of the light guide layer 30 that is perpendicular to the light guide direction of light as illustrated in FIG. 8, the phase difference plate 60 is a λin plate, and may have a thickness changing a phase of light incident to the phase difference plate 60 by 180 degrees.

Accordingly, when light is refracted or reflected by the polarization separation layer 40 toward the light guide layer 30, or is incident to the phase difference plate 60 at an acute angle, a phase of light varies by about 180 degrees, and thus the S-polarized light is maintained. Thus, the S-polarized light is reflected by the reflection plate 70, returns to the light guide layer 30, and is emitted from the polarization separation layer 40. Thus, the S-polarized light is emitted, and light of the P-polarized light is prevented from being emitted.

As described above, light that propagates in the light guide layer 30 is usually not incident on the phase difference plate 60 at a right angle, and thus is converted from the P-polarization component to the S-polarization component by the λon phase difference plate 60.

<Fifth Embodiment>

Figure 9:
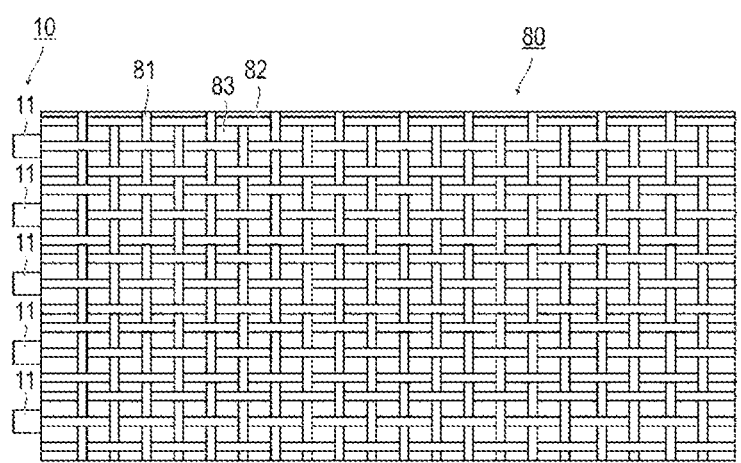
FIG. 9 is a side view of a surface light source apparatus according to another example embodiment.

FIG. 9 is a side view of a surface light source apparatus according to another example embodiment.

The surface light source apparatus illustrated in FIG. 9 includes a polarization separation light homogenization layer 80.

In the first through fourth example embodiments described above, the polarization separation layer 40 and the light homogenization layer 50 are separately included.

However, as illustrated in FIG. 9, the surface light source apparatus may include the polarization separation light homogenization layer 80 that is formed by integrating the polarization separation layer 40 and the light homogenization layer 50.

Referring to FIG. 9, the polarization separation light homogenization layer 80 includes first fibers 81 and second fibers 82, and a third supporting medium 83 that supports the first and second fibers 81 and 82. The first fibers 81 extend parallel to the incident surface 30a of the light guide layer 30, and the plurality of first fibers 81 are arranged in a direction perpendicular to the incident surface 30a. The second fibers 82 extend in a direction perpendicular to the incident surface 30a, and the plurality of second fibers 82 are arranged in a direction parallel to the incident surface 30a. For example, the first fibers 81 and the second fibers 82 extend and are arranged in directions at right angles to each other, and while the first and second fibers 81 and 82 are woven with each other, they are supported by the third supporting medium 83.

In the polarization separation light homogenization layer 80, an ordinary ray refractive index no1 and an extraordinary ray refractive index ne1 of the first fibers 81, an ordinary ray refractive index no2 and an extraordinary ray refractive index neo2 of the second fibers 82, and a refractive index $n_{matrix3}$ of the third supporting medium 83 satisfy Equations (4) and (5) below:

$$no_1 = n_{matrix3} < ne_1 \quad (4)$$

$$no_2 < n_{matrix3} = ne_2 \quad (5)$$

Accordingly, the first fibers 81 (warp threads) selectively scatter only an S-polarization component and emit the same through a light emitting surface that is an upper surface of the polarization separation light homogenization layer 80. The second fibers 82 (woof) diffuse light propagating in the light guide layer 30 in an in-plane direction to homogenize a light direction distribution. A refractive index nmatrix3 of the third supporting medium 83 may correspond to the ordinary ray refractive index no1 of the first fibers 81 and may be different from the extraordinary ray refractive index ne1 of the first fibers 81. Thus, the P-polarization component may not be refracted by the first fibers 81 but proceed straight, and only the S-polarization component may be influenced by the extraordinary ray refractive index ne1 of the first fibers 81 and a portion thereof may be emitted through the light emitting surface.

On the other hand, the refractive index nmatrix3 of the third supporting medium 83 may be different from the ordinary ray refractive index not and the extraordinary ray refractive index ne2 of the second fibers 82. Accordingly, the S-polarization component may not be refracted by the second fibers 82 but proceed straight, and only the P-polarization component may be influenced by the extraordinary ray refractive index ne1 of the second fibers 82 and be refracted and reflected to be diffused in the in-plane direction.

As the first and second fibers 81 and 82, the first and second fibers 41 and 51 described above may be used, and the first supporting medium 42 or the second supporting medium 52 may be used as the third supporting medium 83. However, in an example embodiment, in order to satisfy Equations (4) and (5), the first fibers 81 and the second fibers 82 may be formed of different materials.

<Sixth Embodiment>

Figure 10:
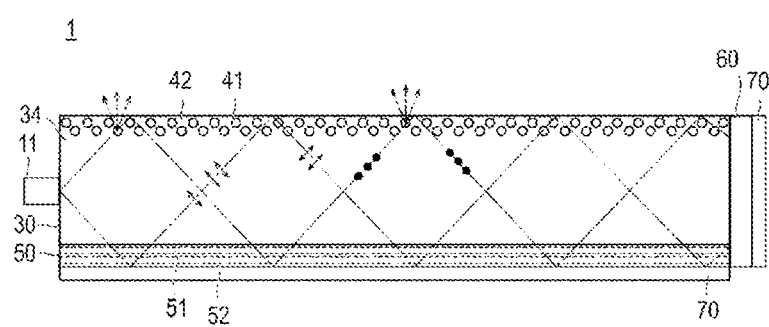
FIG. 10 is a side view of a surface light source apparatus according to another example embodiment.

FIG. 10 is a side view of a surface light source apparatus 1 according to another example embodiment.

In the first through fifth embodiments (FIGS. 1 through 9), the light guide layer 30 is formed of a material different from the first supporting medium 42 and the second supporting medium 52.

However, the light guide layer 30 may be formed of the same material as a material of at least one of the first supporting medium 42 and the second supporting medium 52.

A light guide layer 34 in the surface light source apparatus 1 illustrated in FIG. 10 corresponds to the light guide layer 30 of the surface light source apparatus 1 of FIG. 1 and is formed of the same material as the first supporting medium 42. For example, the light guide layer 34 may be regarded as the light guide layer 30 and the polarization separation layer 40 according to the example embodiment of FIG. 1 integrated into a single layer.

Although not shown in the drawings, the light guide layer 30 of the surface light source apparatus 1 may be formed of the same material as the second supporting medium 52 so that the light guide layer 30 and the light homogenization layer 50 are integrated into a single layer. Although not shown in the drawings, in the surface light source apparatus 1 of FIG. 1, the light guide layer 30, the first supporting medium 42, and the second supporting medium 52 may all be formed of the same material so that the light guide layer 30, the polarization separation layer 40, and the light homogenization layer 50 are integrated into a single layer.

In the surface light source apparatus of FIG. 9, in which the polarization separation light homogenization layer 80 is formed by integrating the polarization separation layer 40 and the light homogenization layer 50, the light guide layer 30 may be formed of the same material as the third supporting medium 83 to integrate the polarization separation light homogenization layer 80 and the light guide layer 30 into a single layer.

By integrating the light guide layer 30 with the polarization separation layer 40 and/or the light homogenization layer 50, manufacturing may be simplified and manufacturing costs may be reduced, and both a light guide panel and a surface light source apparatus having a thin thickness may be manufactured.

The first fibers 41 are arranged in an upper portion of the light guide layer 34 of FIG. 10. Alternatively, the first fibers 41 may be arranged throughout light guide layer 34, or in an area different from the upper portion of the light guide layer 34.

<Seventh Embodiment>

Figure 11:
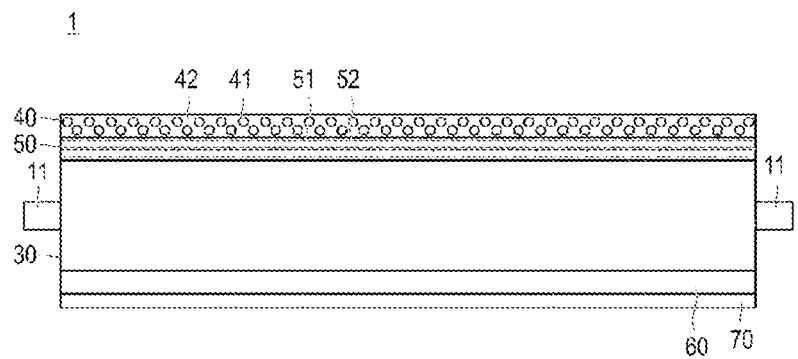
FIG. 11 is a side view of a surface light source apparatus according to another example embodiment.
Figure 12:
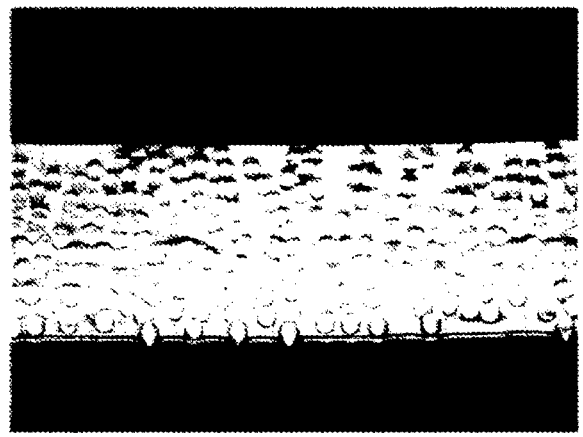
FIG. 12 is an image of a cross-section of a polarization separation layer formed in a surface light source apparatus according to another example embodiment.

FIG. 11 is a side view of a surface light source apparatus 1 according to another example embodiment.

In the surface light source apparatus 1 according to the first through sixth example embodiments, the light source unit 10 is on a side along a short-axis of the light guide layer 30 constituting the light guide panel 20.

However, the surface light source apparatus 1 may include a plurality of light source units 10. For example, as illustrated in FIG. 11, the light source units 10 may be disposed on both sides along the short-axis of the light guide layer 30.

The surface light source apparatus 1 illustrated in FIG. 11 corresponds to the surface light source apparatus 1 of FIG. 8, except that the light source units 10 are on a side of the surface light source apparatus 1 illustrated in FIG. 11 instead of the reflection plate 70.

Although not shown in the drawings, in some of the above-described example embodiments t, for example, in the surface light source apparatuses 1 of the first, second, and fourth embodiments, the light source units 10 may be disposed on both sides along the short-axis of the light guide layer 30. For example, the light source units 10 may face each other with respect to the light guide layer 30.

The light source units 10 may be further disposed on a side besides a light-emitting surface of a long-axis of the light guide layer 30.

EXPERIMENTAL EXAMPLES

Experimental examples conducted to verify the effects of the surface light source apparatuses according to some example embodiments and a comparative example are described. The technical scope is not limited to the experimental examples.

Experimental Example 1

Preparation of Light Guide Layer

As a light guide layer, PMMA (size: 6 cm×9 cm) was prepared.

(2) Formation of Polarization Separation Layer

As a first fiber, PET fibers (material: PET, no=1.5449, ne=1.7200, a surface roughness of external circumferential surface (Rz)=2 μm, cross-section: circular (diameter: 20 μm)) were arranged to a thickness of fifteen layers in one direction on an upper surface of the prepared light guide layer. As a first supporting medium designed to have a refractive index of 1.545 after curing, a UV curable resin was penetrated between the PET fibers. A mixture of 40 parts by weight of EA-F5503 available by Osaka Gas Chemicals Co., Ltd.; 58 parts by weight of MK esterA-400 available by Shin Nakamura Chemical Co., Ltd.; and 2 parts by weight of Photopolymer Initiator Irgacure available by Shiba Specialty Chemicals was used as the UV curable resin. The air between the PET fiber and the UV curable resin was removed by vacuum degassing, and then the UV curable resin was covered with a released glass plate, and a UV lamp was used to cure the UV curable resin. The glass plate was exfoliated to form a polarization separation layer on the light guide layer.

When observing a cross-section of the polarization separation layer using a laser microscope (available by Keyence Corporation VK-9600), as illustrated in FIG. 11, the polarization separation layer has a structure in which the first fibers arranged in one direction are supported by the UV curable resin.

(3) Formation of Light Homogenization Layer

As a second fiber, N610 fibers (material: Nylon 6,10, no=1.5217, ne=1.5711, cross-section: circular (diameter: 50 μm)) were arranged on a lower surface of the prepared light guide layer in three layers in a direction perpendicular to the arrangement direction of the first fibers of the polarization separation layer. As a second supporting medium designed to have a refractive index of 1.571, a UV curable resin was penetrated between the N610 fibers. A mixture of 40 parts by weight of EA-F5503 available by Osaka Gas Chemicals Co., Ltd.; 58 parts by weight of MK esterA-400 available by Shin Nakamura Chemical Co., Ltd., and 2 parts by weight of Photopolymer initiator Irgacure available by Shiba Specialty Chemicals may be used as the UV curable resin. By curing the UV curable resin in the same manner as when forming the polarization separation layer, a light homogenization layer was formed on the light guide layer.

(4) Arrangement of Light Source Unit, Phase Difference Plate, and Reflection Plate A light source unit including nine LEDs as light sources arranged in one dimension (serial arrangement) is installed along a short-axis of the light guide layer. The side at which the light source unit is installed is set to be parallel to the length direction of the first fibers of the polarization separation layer, and perpendicularly to the length direction of the second fibers of the light homogenization layer, and the arrangement direction of the LEDs is set to be in a direction parallel to the length direction of the first fibers of the polarization separation layer. Then, a $\lambda$se phase difference plate is arranged at a side of the light guide layer opposite to the side where the light source unit is installed. Also, a reflection plate is mounted on all surfaces except an upper surface of the polarization separation layer (light-emitting surface) and the side on which the light source unit is installed. Consequently, the surface light source apparatus was manufactured. The surface light source apparatus according to Experimental example 1 corresponds to the surface light source apparatus of the example embodiment illustrated in FIG. 1.

Experimental Example 2

A light homogenization layer was formed on the upper surface of the light guide layer. The surface light source apparatus was manufactured in the same manner as Experimental example 1 except that PET fibers (PET, no=1.5449, ne=1.7200, a surface roughness of external circumferential surface (Rz)=2 μm, cross-section: circular (diameter: 20 μm)) were used as the second fiber, and a UV curable resin designed to have a refractive index of 1.605 after curing was used as the second supporting medium. A mixture of 68 parts by weight of EA-F5503 available by Osaka Gas Chemicals Co., Ltd.; 30 parts by weight of benzylacrylate; and 2 parts by weight of Photopolymer Initiator Irgacure 184 available by Shiba Specialty Chemicals may be used as the UV curable resin.

The surface light source apparatus manufactured according to Experimental example 2 corresponds to the surface light source apparatus 1 illustrated in FIG. 6.

Experimental Example 3

A polarization separation layer was formed on the upper surface of a light guide layer. Except that a light homogenization layer was formed on the upper surface of the polarization separation layer, the surface light source apparatus was manufactured in the same manner as Experimental example 2.

The surface light source apparatus manufactured in Experimental example 3 corresponds to the surface light source apparatus 1 illustrated in FIG. 7.

Experimental Example 4

A surface light source apparatus was manufactured in the same manner as Experimental example 2 except that PET fibers (PET, no=1.5449, ne=1.7200, a surface roughness of external circumferential surface (Rz)=2 μm, cross-section: equilateral triangular (each side length: 10 um) were used as first fibers forming the polarization separation layer.

Comparative Example 1

A surface light source apparatus was manufactured in the same manner as Experimental example 1 except that a light homogenization layer was not formed.

[Evaluation]

In the surface light source apparatuses obtained in the experimental examples and Comparative example 1, a luminance of light emitted from the light emitting surface and luminance spots and a polarization of the light were measured. The luminance, the luminance spots, and the polarization were measured by using a two-dimensional colorimeter, Konica Minolta CA-2000 or Conoscope 80 available by AUTRONIC-MELCHERS GmbH in combination with a polarization plate to calculate a ratio of a desired polarization component. A luminance was measured by driving the serially-arranged nine LEDs with a constant current of 30 mA. As the luminance of emitted light, front luminance in the center of the light-emitting surface of the light guide panel was measured. Table 2 below shows the measurement result.

Figure 13:
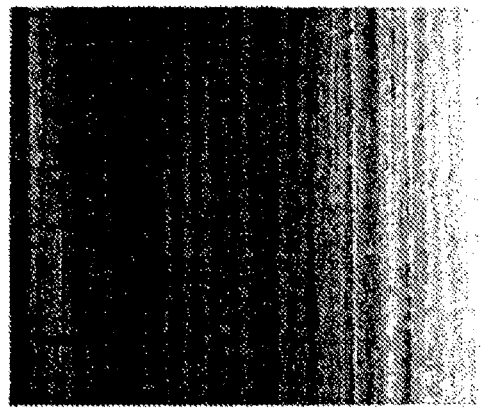
FIG. 13 an image illustrating two-dimensional luminance distribution of light emitted through an image plane of a light guide panel (light-emitting surface) of a surface light source apparatus according to another example embodiment.
Figure 14:
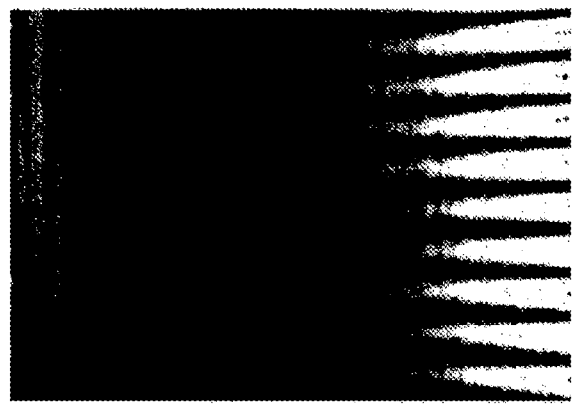
FIG. 14 an image illustrating two-dimensional luminance distribution of light emitted through an image plane of a light guide panel (light-emitting surface) of a surface light source apparatus according to a comparative example.

Referring to FIGS. 13 and 14, two-dimensional luminance distribution of light emitted from an upper surface of the light guide panel (light-emitting surface) of the surface light source apparatuses manufactured according to Experimental example 2 and Comparative example 1 measured by CA-2000 is shown. The same two-dimensional luminance distribution as that shown in FIG. 13 may be obtained from the surface light source apparatuses manufactured according to Experimental examples 1, 3, and 4.

TABLE 2

| | Stacking order of light homogenization layer, light guide layer, and polarization separation layer | polarization separation layer | | light homogenization layer | | Evaluation | | |
|---|---|---|---|---|---|---|---|---|
| | | First fiber | First supporting medium | Second fiber | Second supporting medium | Luminance spots | Luminance (cd/m²m²) | Polarization (s polarization:p polarization) |
| Experimental Example 1 | Light homogenization layer, light guide layer, polarization separation layer | no = 1.545 ne = 1.720 | $nm_1$ = 1.545 | no = 1.5217 ne = 1.5711 | $nm_2$ = 1.571 | No stripe spots in light | 1200 | 16:1 |
| Experimental Example 2 | Light guide layer, light homogenization layer, polarization separation layer | no = 1.545 ne = 1.720 | $nm_1$ = 1.545 | no = 1.545 ne = 1.720 | $nm_2$ = 1.605 | No stripe spots in light | 1400 | 15:1 |

TABLE 2-continued

| | Stacking order of light homogenization layer, light guide layer, and polarization separation layer | polarization separation layer | | light homogenization layer | | Evaluation | | |
|---|---|---|---|---|---|---|---|---|
| | | First fiber | First supporting medium | Second fiber | Second supporting medium | Luminance spots | Luminance (cd/m²m²) | Polarization (s polarization:p polarization) |
| Experimental Example 3 | Light guide layer, polarization separation layer, light homogenization layer | no = 1.545 ne = 1.720 | $nm_1$ = 1.545 | no = 1.545 ne = 1.720 | $nm_2$ = 1.605 | No stripe spots in light | 1300 | 10:1 |
| Experimental Example 4 | Light guide layer, light homogenization layer, polarization separation layer | no = 1.545 ne = 1.720 | $nm_1$ = 1.545 | no = 1.545 ne = 1.720 | $nm_2$ = 1.605 | No stripe spots in light | 2900 | 15:1 |
| Comparative example 1 | Light guide layer, polarization separation layer | no = 1.545 ne = 1.720 | $nm_1$ = 1.545 | — | | No stripe spots in light | 1000 | 16:1 |

In the surface light source apparatuses of Experimental examples 1 through 4 in which the light homogenization layer is included, as illustrated in FIG. 13, stripe spots are not observed in light emitted from the upper surface of the stacked structure. Thus, as can be seen from this result, according to the surface light source apparatuses of some of the example embodiments, luminance spots are removed when an LED, which is a discontinuous light source, is used. According to the surface light source apparatuses manufactured according to the above experimental examples, high polarization separation performance may be obtained.

In the surface light source apparatus manufactured according to Comparative example 1, a ratio of polarization separation is similar to that of Experimental examples. However, as illustrated in FIG. 14, stripe spots are clearly observed in light emitted from the upper surface of the stacked structure.

In the surface light source apparatus of Experimental example 4 in which the first fibers of the polarization separation layer have an equilateral triangular cross-section, an intensity (luminance) of light emitted in a direction perpendicular to the light guide layer (light emitted from the upper surface of the stacked structure) is twice as large as that in the surface light source apparatus of Experimental example 2 in which the first fibers have a circular cross-section.

As described above, according to at least one of the example embodiments, the surface light source apparatuses have excellent polarization separation performance, and, even when a discontinuous light source such as an LED is used, stripe spots of light may be prevented.

Hereinafter, a flat panel display according to an example embodiment will be described.

The flat panel display includes a liquid crystal panel on which an image is formed and a light source apparatus that supplies light used in displaying the image to the liquid crystal panel. The light source apparatus may be a surface light source apparatus according to the example embodiments. The liquid crystal panel may be on a surface from which light of the surface light source apparatus is emitted. The liquid crystal panel may be a typical liquid crystal panel.

It should be understood that the example embodiments described herein should be considered in a descriptive sense only and not for purposes of limitation. Descriptions of features or aspects within each example embodiment should typically be considered as available for other similar features or aspects in other example embodiments.

What is claimed is:

1. A light guide panel comprising:
    a light guide layer having a light incident surface;
    a polarization separation layer configured to select a desired polarization among light emitted from the light guide layer and to emit light having the desired polarization; and
    a light homogenization layer including a plurality of first fibers and a first supporting medium of the first fibers, the light homogenization layer configured to diffuse and scatter light incident on the light incident surface into the light guide layer.

2. The light guide panel of claim 1, wherein the polarization separation layer comprises:
    a plurality of second fibers having birefringence; and
    a second supporting medium that is isotropic and configured to support the second fibers.

3. The light guide panel of claim 2, wherein a refractive index of the second supporting medium corresponds to at least one of two different refractive indices of the second fibers.

4. The light guide panel of claim 1, wherein the polarization separation layer comprises:
    a plurality of second fibers having birefringence; and
    a second supporting medium that is isotropic and configured to support the second fibers; and
    wherein the plurality of first fibers have birefringence, and the first supporting medium is isotropic and configured to support the first fibers.

5. The light guide panel of claim 4, wherein a refractive index of the first supporting medium is different from at least one of the two different refractive indices of the first fibers.

6. The light guide panel of claim 4, wherein an ordinary ray refractive index $no_2$ and an extraordinary ray refractive index $ne_2$ of the first fibers and a refractive index $nm_2$ of the first supporting medium satisfy Equation (1) below:

$$no_2 < nm_2 < ne_2 \qquad (1).$$

7. The light guide panel of claim 2, wherein a surface roughness Rz of an outer circumferential surface of the second fibers is from about 0.1 µm to about 10 µm.

8. The light guide panel of claim 2, wherein the second fibers have a polygonal cross-section in a radius direction.

9. The light guide panel of claim 4, wherein one of the light guide layer, the polarization separation layer, and the light homogenization layer is between the remaining two layers.

10. The light guide panel of claim 2, further comprising:
a phase difference plate configured to convert a polarization direction of light in the light guide layer; and
a reflection plate on a surface other than (i) the light incident surface and (ii) a light emitting surface of the light guide layer, the reflection plate configured to reflect light emitted from the light guide layer back into the light guide layer.

11. The light guide panel of claim 9, wherein the polarization separation layer and the light homogenization layer are on the light emitting surface of the light guide layer.

12. The light guide panel of claim 11, wherein the polarization separation layer and the light homogenization layer are integrated into a single layer.

13. The light guide panel of claim 12, wherein in the single layer, the first fibers and the second fibers alternate, and a third supporting medium includes the first and second supporting media and is configured to support the first and second fibers.

14. The light guide panel of claim 12, further comprising:
a phase difference plate configured to convert a polarization direction of light in the light guide layer; and
a reflection plate on a surface other than (i) the light incident surface and (ii) the light emitting surface of the light guide layer, the reflection plate configured to reflect light emitted from the light guide layer back into the light guide layer.

15. The light guide panel of claim 9, wherein the light guide layer is a same material as at least one of the first and second supporting media.

16. The light guide panel of claim 13, wherein an ordinary ray refractive index $no_1$ and an extraordinary ray refractive index $ne_1$ of the second fibers, an ordinary ray refractive index $no_2$ and an extraordinary ray refractive index $ne_2$ of the first fibers and a refractive index $n_{matrix3}$ of the third supporting medium satisfy Equations (4) and (5) below:

$$no_1 = n_{matrix3} < ne_1 \qquad (4)$$

$$no_2 < n_{matrix3} = ne_2 \qquad (5).$$

17. The light guide panel of claim 4, wherein a density of the second fibers is higher away from the light incident surface.

18. The light guide panel of claim 4, wherein a density of the first fibers varies according to arrangement positions.

19. The light guide panel of claim 4, wherein some of the plurality of first and second fibers comprise discontinuous portions.

20. The light guide panel of claim 4, wherein portions of the plurality of first and second fibers overlap.

21. The light guide panel of claim 13, wherein the first fibers and the second fibers are different materials.

22. A surface light source apparatus comprising:
a light source unit including a plurality of light sources spaced apart from one another; and
a light guide panel configured to emit light having a polarization component of light incident from the light source unit,
wherein the light guide panel is one of claim 1.

23. The surface light source apparatus of claim 22, wherein the polarization separation layer comprises:
a plurality of second fibers having birefringence; and
a second supporting medium that is isotropic and configured to support the second fibers; and
wherein the plurality of first fibers have birefringence, and the first supporting medium is isotropic and configured to support the first fibers.

24. The surface light source apparatus of claim 23, wherein a density of the first fibers is higher between the plurality of light sources.

25. The surface light source apparatus of claim 22, wherein the plurality of light sources are on two opposite sides of the light guide panel.

26. The surface light source apparatus of claim 23, wherein one of the light guide layer, the polarization separation layer, and the light homogenization layer is between the remaining two layers.

27. The surface light source apparatus of claim 23, further comprising:
a phase difference plate configured to convert a polarization direction of light in the light guide layer; and
a reflection plate on a surface except (i) the light incident surface and (ii) a light emitting surface of the light guide layer, the reflection plate configured to reflect light emitted from the light guide layer back into the light guide layer.

28. The surface light source apparatus of claim 26, wherein the polarization separation layer and the light homogenization layer are on the light emitting surface of the light guide layer.

29. The surface light source apparatus of claim 23, wherein the polarization separation layer and the light homogenization layer are integrated as a single layer.

30. The surface light source apparatus of claim 29, wherein in the single layer, the first fibers and the second fibers alternate, and a third supporting medium includes the first and second supporting media and is configured to support the first and second fibers.

31. The surface light source apparatus of claim 29, further comprising:
a phase difference plate configured to convert a polarization direction of light in the light guide layer; and
a reflection plate on a surface except (i) the light incident surface and (ii) a light emitting surface of the light guide layer, the reflection plate configured to reflect light emitted from the light guide layer back into the light guide layer.

32. The surface light source apparatus of claim 26, wherein the light guide layer is a same material as at least one of the first and second supporting media.

33. The surface light source apparatus of claim 23, wherein a density of the second fibers is higher away from the light incident surface.

34. A flat panel display comprising:
a light source apparatus; and
a liquid crystal panel configured to display an image with light supplied from the light source apparatus, wherein the light source apparatus is the surface light source apparatus of claim 22.

35. The flat panel display of claim 34, wherein the plurality of first fibers have birefringence and the first supporting medium is isotropic and configured to support the first fibers.

36. The light guide panel of claim 1, wherein the light homogenization layer is provided in a lengthwise direction of the light guide layer.

37. The light guide panel of claim 36, wherein the light homogenization layer is provided substantially over an entire portion of a surface of the light guide layer.

38. The device of claim 14, wherein the light homogenization layer is provided one of in a first direction perpendicular to the light incident surface and in a second direction which is inclined by about ±45° with respect to the first direction perpendicular to the incident surface.

* * * * *